April 3, 1956   L. C. REINEBACH   2,740,326
SLIDE CHANGER
Filed May 21, 1953   3 Sheets-Sheet 2
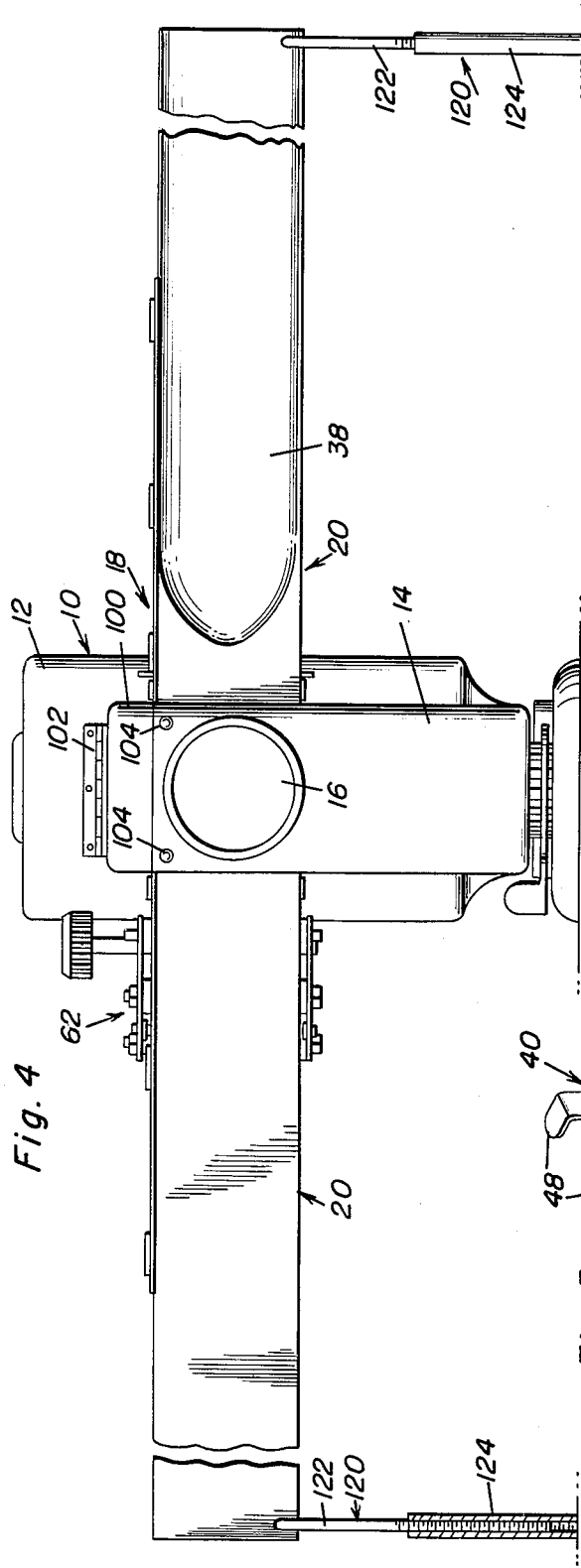
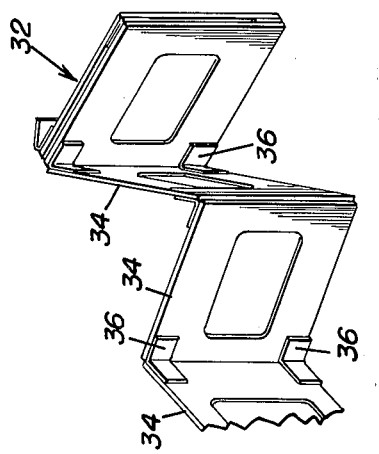
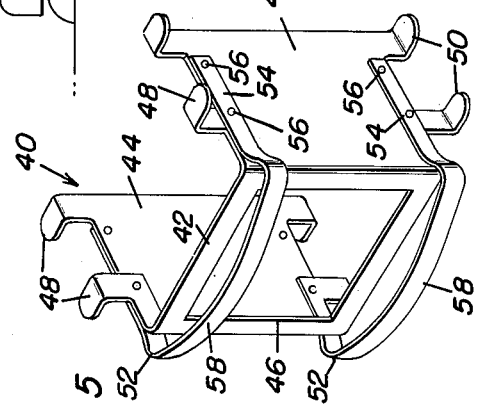
Lewis C. Reinebach
INVENTOR.
BY Clarence A. O'Brien
and Harvey B. Jacobson
Attorneys

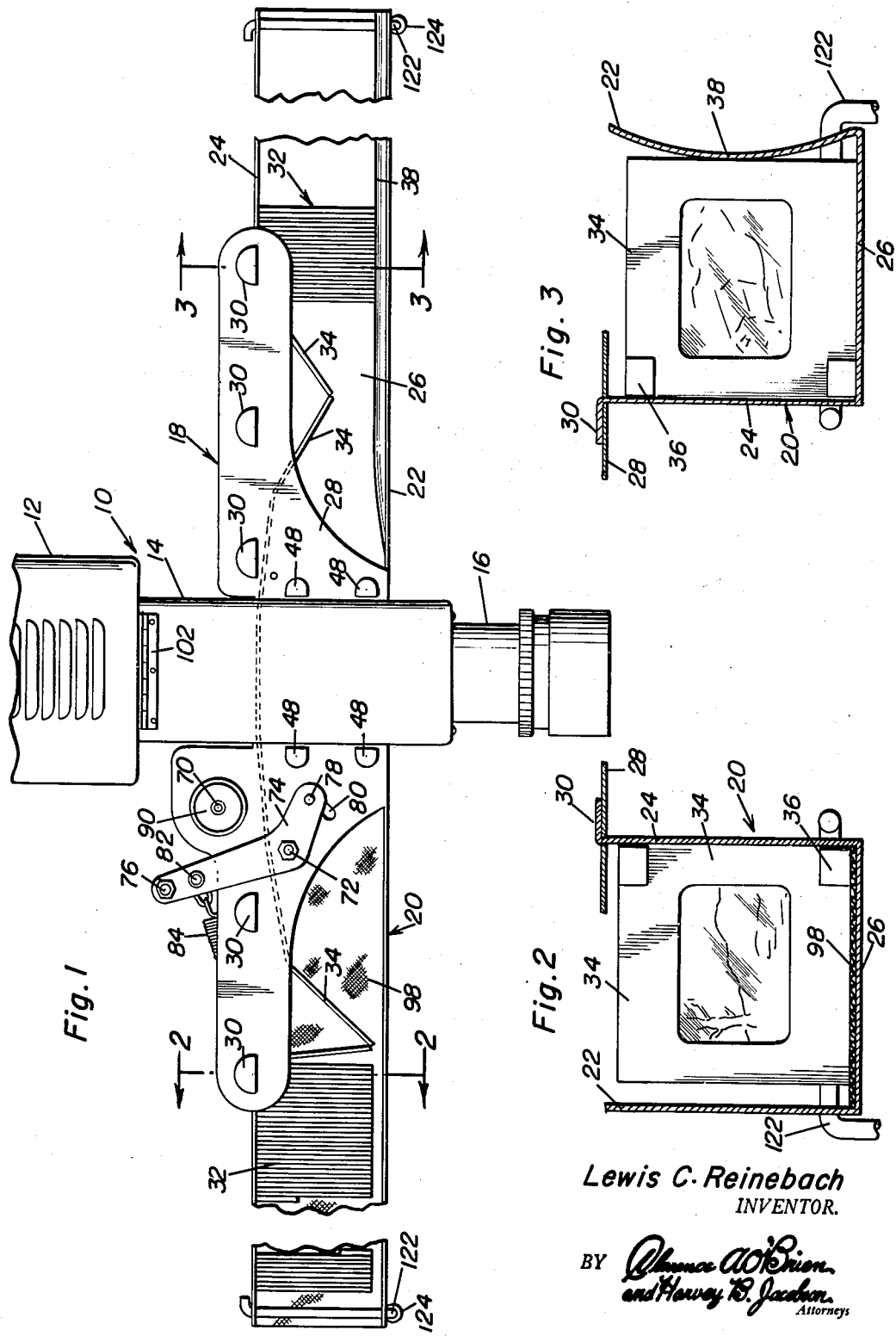

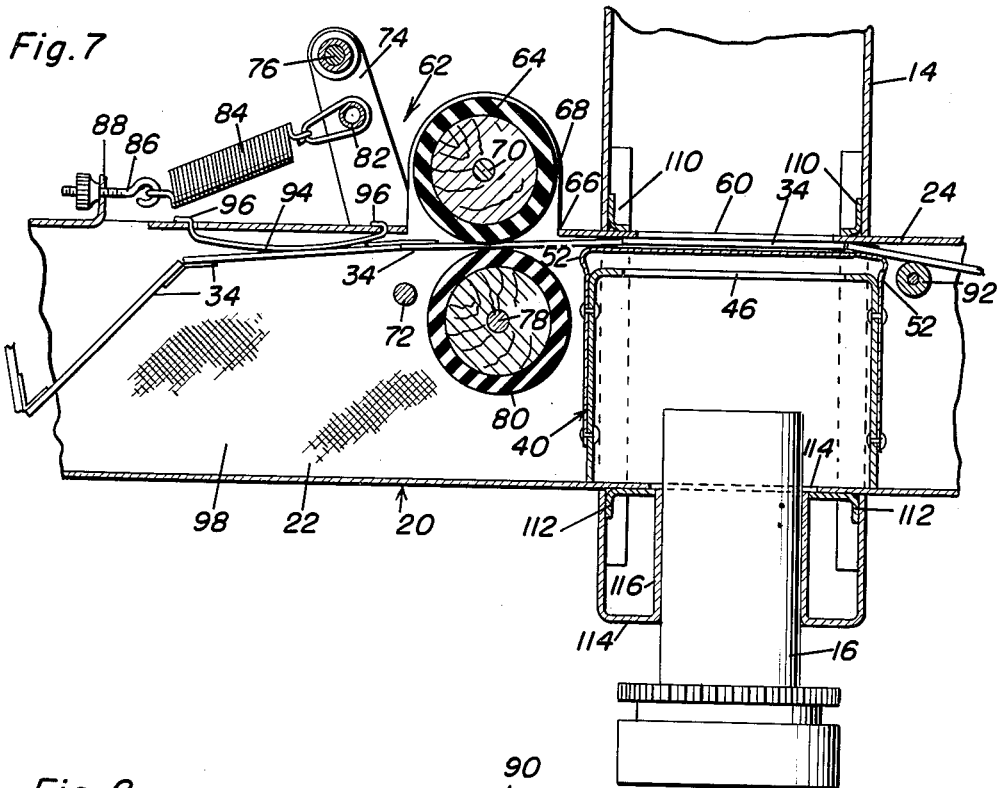
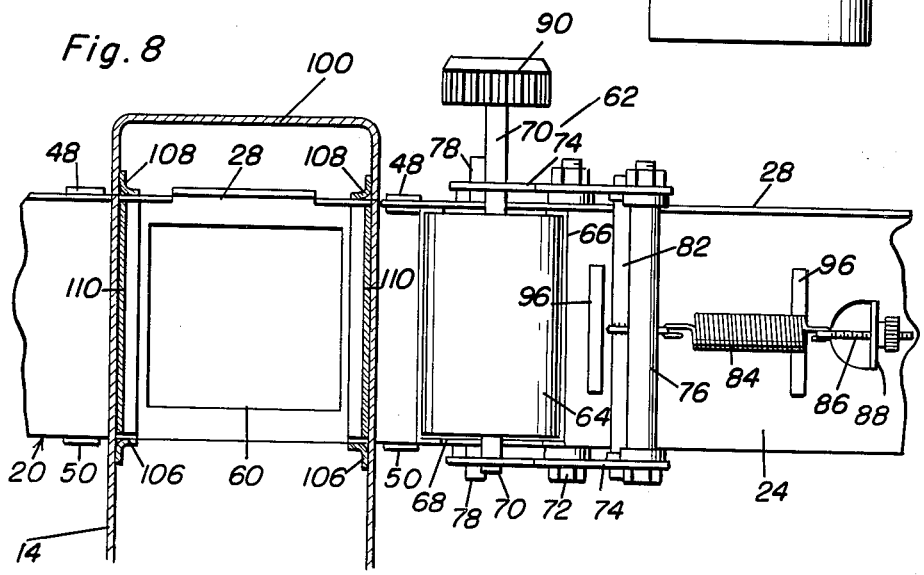

United States Patent Office 2,740,326
Patented Apr. 3, 1956

2,740,326

SLIDE CHANGER

Lewis C. Reinebach, Payson, Ill.

Application May 21, 1953, Serial No. 356,385

1 Claim. (Cl. 88—28)

This invention relates in general to improvements in slide projectors, and more specifically to a slide changer for slide projectors.

The average slide projector is provided with a simple slide receiver which selectively receives a pair of individual slides, one of the slides being disposed in an operative position, the other slide being positioned in a slide changer for ease of removal therefrom. With this particular type of slide changer, the operator of a slide projector must have the individual slides disposed in proper order and must be careful to replace the slides in the same order after they have been projected on a screen. It will thus be seen that the operator of a slide projector has a full time job operating the slide projector.

It is therefore the primary object of this invention to provide an improved slide changer for a slide projector in which the individual slides may be mounted in elongated strips and progressively fed through the slide projector for projecting on a screen or the like, the slides being mounted in elongated strips, there being little possibility of an error on the part of the slide projector operator.

Another object of this invention is to provide an improved slide changer in the form of a magazine removably carried by a slide projector, the magazine having mounted therein a plurality of individual slides hingedly connected together to form an elongated strip, the magazine having carried thereby a drive means for selectively moving slides through the magazine into path of a light source of an associated slide projector.

Another object of this invention is to provide an improved slide changer for a slide projector which includes an elongated magazine adapted to be carried by a light tube portion of a slide projector, the magazine having carried thereby guide means for individual slides for maintaining the slide to be projected in the focal plane of the slide projector.

Another object of this invention is to provide an improved slide changer of the magazine type which may be conveniently and easily adapted to existing types of slide projectors.

A further object of this invention is to provide an improved slide changer adapted for selectively feeding individual slides of an elongated strip of slides in front of a light source of a slide projector, the slide changer being provided with means for automatically refolding the individual slides into face-to-face engagement for storage purposes.

A still further object of this invention is to provide an improved strip construction for slides, the strip being formed of a plurality of individual slides hingedly connected together, adjacent slides being connected together by flexible straps alternately secured to opposite faces thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevated view of a forward portion of a conventional light projector which has mounted therein the slide changer which is the subject of this invention, end portions of the magazine part of the slide changer being omitted;

Figure 2 is an enlarged transverse sectional view taken substantially upon the plane indicated by the section line 2—2 of Figure 1 and shows the relationship of slides within the magazine part of the slide changer after they have been returned to their folded state;

Figure 3 is an enlarged transverse sectional view taken substantially upon the plane indicated by the section line 3—3 of Figure 1 and shows the relationship of individual slides prior to their movement through the slide changer;

Figure 4 is a front elevational view of the slide projector of Figure 1 and shows the general appearance of the slide changer;

Figure 5 is an enlarged, rotated perspective view of a resilient guide member for the slide changer, the resilient guide member being adapted to retain individual slides in the focal plane of the slide projector;

Figure 6 is a fragmentary perspective view of a central portion of a strip of slides and shows the manner in which the individual slides are hingedly connected together;

Figure 7 is an enlarged fragmentary horizontal sectional view taken through the forward portion of the slide projector and the slide changer and shows the relationship of slides passing through the slide changer and the manner in which they are automatically urged into folded positions after passing through the light tube portion of the slide projector, also being illustrated is the drive means for the slide changer; and Figure 8 is a fragmentary transverse sectional view taken through the light tube portion of the slide projector rearwardly of the slide changer and shows the general arrangement of drive means of the slide changer.

Referring now to the drawings in detail, it is seen that there is illustrated a slide projector which is referred to in general by reference numeral 10. The slide projector 10 is of a conventional construction and includes a ventilated light housing 12 which has communicated therewith a forwardly extending light tube portion 14. Carried at the forward end of the light tube portion 14 is a lens 16. Carried by the light tube portion 14 rearwardly of the lens 16 is the improved slide changer which is the subject of this invention, the slide changer being referred to in general by the reference numeral 18.

The slide changer 18 includes an elongated magazine 20 which is generally rectangular in cross-section, as is best illustrated in Figure 2. The magazine 20 includes an elongated front wall 22 which is disposed in spaced parallel relation with respect to an elongated rear wall 24. The front and rear walls, 22 and 24, respectively, are connected together by an integral wall 26. The magazine 20 also includes a centrally located fragmentary top wall 28 which is integral with the front wall 22 and which has a rear portion overlying the rear wall 24 and extending rearwardly thereof. The rear wall 24 is provided with a plurality of spaced upstanding tabs 30 which secure the fragmentary top wall 28 to the rear wall 24.

The slide changer 18 is particularly designed for use with an elongated strip of slides, the strip being referred to in general by the reference numeral 32. The strip 32 includes a plurality of individual slides 34 which are hingedly connected together so that they may be folded into face-to-face engagement. The individual slides are hingedly connected together by flexible straps 36 which are secured to the faces thereof adjacent the upper and lower edges of the individual slides. It will be noted that the flexible straps 36 are alternately secured to opposite faces of the slides 34, as is best illustrated in Figure 6.

It is intended that the individual slides 34 of the strip 32 be fed through the magazine 20 from right to left, as is best illustrated in Figure 1. Initially, the individual slides 34 of the strip 32 are disposed in the right hand side of the magazine 20. In order that the slides 34 may be retained in their initial positions, the front wall 22 of the magazine 20 is provided with an inwardly bowed portion 38 which resiliently engages adjacent edges of the slides 34 in the manner best illustrated in Figure 3.

Referring now to Figure 5 in particular, it will be seen that there is illustrated a guide member for the slide changer 18. The guide member is referred to in general by the reference numeral 40 and includes a supporting frame having a rear wall 42 and a pair of side walls 44. It will be noted that the rear wall 42 is provided with an enlarged light receiving opening 46 therethrough. The side walls 44 are provided with vertically extending upper and lower tabs 48 and 50, respectively. The tabs 48 and 50 pass through the top wall 28 and the bottom wall 26, respectively, of the magazine 20 and retain the supporting frame of the guide member 40 in position, in the manner best illustrated in Figures 1 and 8.

The guide member 40 also includes a pair of resilient strips 52 which are generally U-shaped in outline. The resilient strips 52 include forwardly extending legs 54 which are secured to upper and lower portions of the side walls 44 by suitable fasteners 56. The resilient strips 52 also include rearwardly bowed intermediate portions 58.

Referring now to Figure 7 in particular, it will be noted that that portion of the rear wall 24 of the magazine 20 disposed within the confines of the light tube portion 14 is provided with an enlarged central opening 60. The central opening 60 is disposed in alignment with the opening 46 to permit the passage of light rays from the housing 12 through the light tube portion 14 into the lens 16. The resilient strips 52 resiliently engage slides 34 passing through the magazine 20 to clampingly retain such slides against the central portion of the rear wall 24 in alignment with the opening 60. It will be understood that the relationship of the rear wall 24 and the resilient strips 52 is such that slides 34 disposed therebetween will be in the focal plane of the light projector 10.

In order that individual slides 34 may be progressively fed through the magazine 20, there is provided drive means which are referred to in general by the reference numeral 62. The drive means 62 includes a fixed roller 64 which is disposed externally of the magazine 20 and projects partially thereinto through an opening 66 in the rear wall 24 thereof. In forming the opening 66, a portion of the rear wall 24 is cut out and bent downwardly to provide a lower supporting flange 68 for the roller 64. The roller 64 is rotatably carried by a shaft 70 which has its upper and lower ends journaled in the top wall 28 and the flange 68, respectively.

Extending between the bottom wall 24 and the top wall 26 of the magazine 20 adjacent the roller 64 is a vertical extending pivot pin 72. The pivot pin 72 has pivotally connected to upper and lower ends thereof L-shaped levers 74. The outer ends of the levers 74 are rigidly connected together by a vertically extending fastener 76 whereas the ends of the lever 74 disposed adjacent the magazine 20 are connected together by a vertically extending shaft 78 which passes through the magazine 20. It will be noted that the shaft 78 passes through arcuate slots 80 in the bottom and top walls of the magazine 20 to permit pivoting of the levers 74 on the pivot pin 72. Carried by the shaft 78 for rotation is a second roller 80, the second roller 80 being disposed immediately adjacent the first roller 68, but within the confines of the magazine 20.

In order that the second roller 80 may be resiliently urged towards the first roller 64, the levers 74 are connected together adjacent the fastener 76 by a vertically extending pin 82. The pin 82 has connected thereto one end of a coil spring 84. The other end of the coil spring 84 is connected by an adjustable fastener 86 to a tab 88 struck from the rear wall 24 of the magazine 20. It will be noted that the spring 84 is so positioned whereby it urges the second roller 80 towards the first roller 64 whereby a slide 34 may be clampingly engaged therebetween.

In order that a slide 34 disposed between the rollers 64 and 80 may be urged to the left, the shaft 70 of the roller 64 extends upwardly through the top wall 28 of the magazine 20. The upper end of the shaft 70 is provided with an actuating knob 90 through which the roller 64 may be rotated to urge a slide 34 to the left, as is best illustrated in Figure 7.

It will be seen that the action of the drive means 62 is such that when the roller 64 is rotated, individual slides 34 will be pulled from the right side of the magazine 20 to the left side thereof with the slides 34 passing through the light path of the slide projector 10. In order that movement of the individual slides 34 between the resilient strips 52 and the associated portion of the rear wall 24 may be facilitated, the magazine 20 also includes a vertically extending roller 92 disposed adjacent the entrance to such space.

After the individual slides 34 have passed through the drive means 62, they must be refolded into face-to-face relation in order the left hand side of the magazine 20 may accommodate all of the slides which were originally positioned in the right hand side of the magazine. In order to accomplish refolding of the slides 34, there is secured to the rear wall 24 of the magazine 20 immediately adjacent the rollers 64 and 80 an arcuate guide member 94. The guide member 94 is provided with tabs 96 which pass through the rear wall 24 to facilitate mounting of the guide member.

It will be seen that the arcuate guide member 94 is so positioned that when individual slides 34 pass through the space between the rollers 64 and 80, the individual slides will be urged towards the front wall 22. This will cause a first slide passing into a left hand side of the magazine 20 to engage the front wall 22. The second slide passing through the space between the rollers 64 and 80 will then urge the right hand end of the first slide 34 to the rear in the manner best illustrated in Figure 7 to cause partial folding of such slide. The next slide 34 will then engage the guide member 94 so that its left hand edge is urged towards the front wall 22. This results in the right hand end of the second slide 34 being urged forwardly with the result that it is folded into face-to-face engagement with the first slide 34. This is repeated until each and every one of the slides 34 is in the left hand side of the magazine 20 in the folded state best illustrated in Figure 1.

It will be understood that folding of the slides 34 in the left hand side of the magazine 20 can be accomplished only if the individual slides 34 are urged in the direction to which they are originally guided by the guide member 94. In order that sliding of the individual slides 34 through the left hand side of the magazine 20 may be resisted, this side of the magazine is provided with a skid resisting covering, such as felt, the covering being referred to by the reference numeral 98 and overlying the bottom wall 26 of the magazine 20.

In order to facilitate positioning and removal of the slide changer 18, the light tube portion 14 of the slide projector 10 is provided with a top wall portion 100 which is hingedly connected at its rear by a hinge 102 to the light housing 12. The top wall portion 100 may be folded upwardly out of overlying relation with respect to the lower part of the light tube portion 14 so that the slide changer 18 may be lifted vertically out of the light tube portion 14. The upper wall portion 100 is retained in its normal position by suitable spring fasteners 104 carried by the adjacent part of the light tube portion.

Referring now to Figure 8 in particular, it will be seen that the lower part of the light tube portion 14 is provided with a pair of longitudinally extending angle members 106 which underlie the magazine 20 to both strengthen the light tube portion 14 and to facilitate the supporting of the magazine 20. The top wall portion 100 is also reinforced by a pair of longitudinally extending angle members 108 which are intended to be seated on the top wall 28 of the magazine 20. It will be noted that the magazine 20 may be positioned with respect to the light tube portion 14 by the tabs 48 and 50 in the manner best illustrated in Figure 8.

Referring now to Figure 7 in particular, it will be seen that the rear part of the light tube portion 14 is also braced by a pair of transversely spaced, vertically extending angle members 110. The angle members 110 are also intended to engage the rear wall 24 of the magazine 20 to facilitate positioning of the magazine 20.

To further reinforce the light tube portion 14 and to provide an abutment for the front wall 22 of the magazine 20, the forward portion of the light tube portion 14 is provided with a pair of transversely spaced, vertically extending angle members 112. The angle members 112 engage the front wall 22 of the magazine 20 on opposite sides of a centrally located light passage 114.

The light tube portion 14 also includes a front wall 115 which has connected thereto a rearwardly extending tubular portion 116. The tubular portion 116 is connected at its rear to the vertically extending angle members 112. Slidably mounted within the tubular portion 116 for adjustment is the rear portion of the lens 16. It will be noted that the rear portion of the lens 16 passes through the light passage 114 and is disposed within the confines of the magazine 20. When it is desired to move the slide changer 18, the lens 16 is moved forwardly so that the magazine 20 may be moved vertically out of the light tube portion 14.

In view of the foregoing, it will be seen that there has been illustrated and described a novel slide changer for slide projectors which may be conveniently attached to or removed from a conventional slide projector and which is so constructed whereby slides carried thereby will be properly positioned with respect to the slide projector. Also, the slide changer is of such a nature whereby slides are progressively passed through the slide projector in their proper sequence with a minimum of effort on the part of an operator.

Referring now to Figures 1 through 4, inclusive, in particular, it will be seen that opposite ends of the magazine 20 are provided with supports which are referred to in general by the reference numeral 120. The supports 120 include elongated threaded members 122 which have adjustably secured on the lower ends thereof internally threaded sleeve members 124. The sleeve members 124 are intended to engage a supporting surface for the slide projector 10 in order to support the outer ends of the magazine 20. The upper ends of the threaded members 122 are angulated, as is best illustrated in Figure 1, and extend transversely through the magazine 20. The angulated upper ends of the members 122 form stops for the slide strip 32 disposed therein to prevent movement of the individual slides 34 out of the ends of the magazine 20.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

In a slide projector having a forwardly extending light tube portion carrying at its front end an axially slidable lens tube and provided with an upwardly opening transverse recess, an elongated, straight slide magazine of rectangular cross-section extending transversely of said light tube portion through said recess with opposite ends extending from opposite sides of said light tube portion, said magazine having front, rear and bottom walls, respectively, and being removable upwardly out of said recess, a light passing aperture in said rear wall in the axis of said lens, and an aperture in said front wall through which said lens tube slidably extends into said magazine over said bottom wall and prevents upward removal of said magazine, a pair of vertical friction gripping rollers in the rear of said magazine and at one side of the light tube portion operative to feed along said back wall past said light passing aperture a foldable strip of hinged together slides, a bowed resilient member on said rear wall engaging the slides fed past said rollers and deflecting the slides forwardly toward folded position, and a guide frame in said magazine for said slides having side walls extending transversely in the magazine at opposite sides of said apertures to prevent the escape of light at the sides of said recess, said guide having transverse upper and lower resilient strips on said walls above and below said light passing aperture yieldingly retaining said slides against said rear wall.

References Cited in the file of this patent

UNITED STATES PATENTS

| | | |
|---|---|---|
| 1,028,692 | Dusseris et al. | June 4, 1912 |
| 1,072,861 | Koike | Sept. 9, 1913 |
| 1,093,401 | Gottlieb | Apr. 14, 1914 |
| 1,257,278 | Brown | Feb. 19, 1918 |
| 1,298,417 | Stillwagon | Mar. 25, 1919 |
| 1,590,704 | Semelroth | June 29, 1926 |
| 2,194,240 | Worth | Mar. 19, 1940 |
| 2,231,743 | Young | Feb. 11, 1941 |
| 2,412,246 | Blumenstein | Dec. 10, 1946 |
| 2,563,893 | Waller et al. | Aug. 14, 1951 |

FOREIGN PATENTS

| | | |
|---|---|---|
| 177,045 | Great Britain | Mar. 23, 1922 |